United States Patent
Roos et al.

(10) Patent No.: US 8,714,431 B2
(45) Date of Patent: May 6, 2014

(54) FRICTION STIR WELDING TOOL

(71) Applicant: Helmholtz-Zentrum Geesthacht Zentrum für Material—und Küstenforschung GmbH, Geesthacht (DE)

(72) Inventors: Arne Roos, Juliusburg (DE); Jan Fritz, Hamburg (DE); Luciano Bergmann, Geesthacht (DE); Jorge F. dos Santos, Tespe (DE)

(73) Assignee: Helmholtz-Zentrum Geesthacht Zentrum für Material—und Küstenforschung GmbH, Geesthacht (DE)

( * ) Notice: Subject to any disclaimer, the term of this patent is extended or adjusted under 35 U.S.C. 154(b) by 0 days.

(21) Appl. No.: 13/683,403

(22) Filed: Nov. 21, 2012

(65) Prior Publication Data

US 2013/0134206 A1 May 30, 2013

(30) Foreign Application Priority Data

Nov. 25, 2011 (EP) ..................................... 11190718

(51) Int. Cl.
*B23K 20/12* (2006.01)

(52) U.S. Cl.
USPC ........................................ 228/2.1; 228/112.1

(58) Field of Classification Search
USPC .................................. 228/2.1, 112.1; 408/84
See application file for complete search history.

(56) References Cited

U.S. PATENT DOCUMENTS

| | | | | | |
|---|---|---|---|---|---|
| 100,772 | A | * | 3/1870 | Kelly | 408/84 |
| 757,950 | A | * | 4/1904 | McElwain et al. | 408/84 |
| 2,296,087 | A | * | 9/1942 | Burns, Jr. | 408/81 |
| 2,576,786 | A | * | 11/1951 | Gray et al. | 408/84 |
| 3,015,240 | A | * | 1/1962 | Hodnett | 408/84 |
| 3,099,173 | A | * | 7/1963 | Paslawsky et al. | 408/84 |
| 3,620,635 | A | * | 11/1971 | DalBianco et al. | 408/84 |
| 5,228,811 | A | * | 7/1993 | Potter | 408/84 |
| 5,318,390 | A | * | 6/1994 | DalBianco | 408/84 |
| 5,713,507 | A | | 2/1998 | Holt et al. | |
| 6,722,556 | B2 | * | 4/2004 | Schilling et al. | 228/112.1 |

(Continued)

FOREIGN PATENT DOCUMENTS

| | | |
|---|---|---|
| EP | 1690628 A1 | 8/2006 |
| JP | 2008036664 A | 2/2008 |
| WO | WO-0128732 A1 | 4/2001 |

*Primary Examiner* — Kiley Stoner
*Assistant Examiner* — Carlos Gamino
(74) *Attorney, Agent, or Firm* — Harness, Dickey & Pierce, P.L.C.

(57) ABSTRACT

A friction welding tool having a pin and a clamping device with a counter bearing, a holddown element and a spring element. The pin has a coupling section for releasable, rotationally fixed coupling to a rotating output device of a machine tool. The counter bearing is held on the pin between the pin's coupling and engagement ends in a manner that allows the counter bearing to be axially immovable on but freely rotatable about a longitudinal axis of the pin. The holddown element surrounds the pin and is arranged on a side of the counter bearing facing the engagement end. The holddown element has a bearing surface for bearing on the workpiece arrangement. The spring element is provided between the holddown element and the counter bearing and is mounted on the pin in such a way that it is elastically slidable along the longitudinal axis of the pin.

13 Claims, 3 Drawing Sheets

(56) References Cited

U.S. PATENT DOCUMENTS

| | | |
|---|---|---|
| 7,404,512 B2 * | 7/2008 | Baumann et al. ............ 228/44.3 |
| 7,448,526 B2 * | 11/2008 | Haynie et al. ................ 228/2.1 |
| 7,490,750 B2 * | 2/2009 | Trapp et al. ................. 228/2.1 |
| 7,654,435 B2 * | 2/2010 | Kumagai et al. .......... 228/112.1 |
| 7,681,773 B2 * | 3/2010 | Burton et al. ............... 228/2.1 |
| 7,748,591 B2 * | 7/2010 | Wood et al. ................. 228/2.1 |
| 8,052,028 B2 * | 11/2011 | Hall et al. ................... 228/2.1 |
| 8,164,021 B1 * | 4/2012 | Ferrando ................... 219/78.13 |
| 8,393,524 B1 * | 3/2013 | Burton et al. ............. 228/112.1 |
| 2005/0045695 A1 | 3/2005 | Subramanian et al. |
| 2006/0124691 A1 | 6/2006 | Wood et al. |
| 2006/0169741 A1 | 8/2006 | Smith et al. |
| 2006/0289604 A1 | 12/2006 | Zettler et al. |
| 2012/0237788 A1 * | 9/2012 | Fujii et al. ................... 428/615 |
| 2012/0267419 A1 * | 10/2012 | Blaski et al. ................ 228/2.1 |

\* cited by examiner

FRICTION STIR WELDING TOOL

CROSS-REFERENCE TO RELATED APPLICATIONS

This application claims the benefit and priority of European Patent Application No. EP 11190718.4, filed Nov. 25, 2011. The entire disclosure of the above application is incorporated herein by reference.

FIELD

The present invention relates to a self-clamping friction welding tool having a pin, which has a coupling end and an engagement end lying opposite the coupling end and which is provided for executing a rotary motion about its longitudinal axis, said longitudinal axis extending between the coupling end and the engagement end, and, at the same time, for engaging by means of its engagement end with the surface of a workpiece arrangement, and having a clamping device, which surrounds the pin, can be moved along the longitudinal axis of the pin and is provided for exerting pressure on the surface of the workpiece arrangement.

BACKGROUND

In general, friction welding involves moving two workpieces resting against one another relative to one another, the friction which arises leading to heating and plasticization of the material of the workpieces in the friction zone. If the two workpieces are placed or pressed against one another, the plasticized material of the two workpieces bonds in the region of contact. One of the special advantages of friction welding is the fact that a large number of different materials can be joined together and that the region of the workpieces which is affected by the welding process is relatively small and is exposed to comparatively low temperatures.

Starting from this basic principle, modifications of the friction welding process have been developed. In friction stir welding, for example, frictional energy is produced by a wear-resistant rotating tool which moves through the material of two workpieces to be joined along or in the vicinity of the bearing surface between them, with the result that the material is plasticized along or in the vicinity of the path of motion of the tool, this in turn making possible the joining of the two workpieces in this region.

The prior art, e.g. WO 01/28732 A1 discloses a friction welding apparatus which has a pin that is driven in rotation about its longitudinal axis and has a coupling end and an engagement end lying opposite the coupling end, wherein the coupling end is rigidly connected to the output of the friction welding apparatus and the engagement end is provided for engaging with the surface of two workpieces placed against one another and penetrating into the material of said workpieces. This publication furthermore discloses the provision of a clamping device on the friction welding apparatus, said device surrounding the pin and being capable of movement relative to the pin along the longitudinal axis of the latter in order to exert pressure on the workpieces. The clamping device is mounted on the machine frame of the friction welding apparatus and can thus be moved independently of the pin.

The disadvantage with a prior art friction welding apparatus of this kind, however, is that it cannot be used in any other way as a machine tool, e.g. for drilling or milling, since at least the clamping device is a fixed part of the machine tool and cannot be detached from the latter. On the other hand, however, a clamping device is indispensable since the workpieces would otherwise be able to move relative to one another during the welding process or could form unwanted gaps.

SUMMARY

Starting from the prior art, it is therefore the object of the present invention to provide a friction welding tool which has a clamping device and can be coupled to a machine tool having a rotatingly driven output device, e.g. an output shaft, and can be interchanged simply and easily between a large number of machine tools.

This object is achieved in that the clamping device has a counter bearing, which is held on the pin between the coupling end and the engagement end in a manner which allows it to be rotated freely around the longitudinal axis of the pin and prevents it from being moved in the direction of the longitudinal axis, that the clamping device has a holddown element, which surrounds the pin, is arranged on the side of the counter bearing facing the engagement end and has a bearing surface, which is provided for bearing on the workpiece arrangement, that a spring element is provided between the holddown element and the counter bearing, and the holddown element is thus mounted on the pin in such a way that it is elastically slidable along the longitudinal axis of the pin, and that, on its coupling end, the pin has a coupling section for releasable, rotationally fixed coupling to a rotating output shaft of a machine tool.

In this way, a friction welding tool is provided, the clamping device of which is held and elastically supported only on the pin, thus enabling the pin and the clamping device to be connected to various machine tools or to be operated by various machine tools as a common system, simply by coupling the coupling section of the pin to the output shaft of a machine tool.

In this context, a spring element in the sense of the present invention should generally be understood to mean an elastically deformable element which exerts a force counter to a deformation in the direction of the longitudinal axis, where the relationship between the deformation and the force does not necessarily have to be linear. Thus, the spring element does not necessarily have to be designed as a helical spring or the like.

During the operation of the friction welding tool for the production of a weld, the coupling end of the pin is clamped in the chuck of a conventional drilling or milling machine or in a chuck on the output shaft of a conventional robot. The respective output shaft or output feature is then moved in such a way that the bearing surface of the holddown element first of all rests on the surface of the workpiece arrangement of the workpieces to be joined.

The pin is then made to rotate and is moved toward the surface of the workpiece arrangement, thereby preloading the spring element arranged between the counter bearing and the holddown element. The preloading force on the spring element is, in turn, transmitted via the holddown element to the surface of the workpiece arrangement, thereby clamping the individual workpieces of the workpiece arrangement together and preventing them from slipping when the pin finally engages with the workpieces as it moves further toward the surface.

According to the invention, the term "engagement with the surface of the workpiece arrangement" is understood to mean both the rubbing of the pin on the surface of the workpieces and the penetration of the pin into the material of the workpieces, below the surface of the latter.

Moreover, the term "a workpiece arrangement" in the sense of the present invention is understood to mean one or more workpieces. In this context, one possibility among others is that two of the workpieces are placed against one another in such a way that they partially overlap, with the pin of the friction welding tool rubbing against the surface of the topmost workpiece, that facing the pin, or penetrating into the surface and thereby at least partially plasticizing the underlying region of the workpieces. In this case, the bearing surface of the holddown element rests against only one workpiece. However, the term "workpiece arrangement" also includes a situation where workpieces are placed against one another in such a way as to form a butt joint and the pin of the friction welding tool is moved parallel to this contact surface of the two workpieces, in the material thereof, or rubs against the surface thereof, thus plasticizing the region of the workpieces along the contact surface of the two workpieces. Here, the bearing surface of the holddown element then rests simultaneously on a plurality of workpieces.

The friction welding tool according to the invention is suitable for producing spot welds, i.e. welds at discrete locations. For example, the requirement may be to join two workpieces only by means of spot welds in order to speed up the welding process or to minimize the zone affected by heat.

At the coupling section of the pin, the friction welding tool according to the invention can be connected to any of various machine tools, including machining centers, drilling or milling machines and even hand tools. Thus, it is conceivable for it to be clamped in the chuck of a hand drill or a routing machine. These possibilities are opened up by the clamping device being held directly on the pin.

In a preferred embodiment, the engagement end has a friction surface extending perpendicularly to the longitudinal axis of the pin. This friction surface is provided for the purpose of exerting rotary friction on the surface of the workpiece arrangement, e.g. when using "Self Clamping Hybrid Friction Diffusion Bonding" (SCHFDB). In this case, the friction surface can preferably have a structure which allows a more effective rubbing action, i.e. accelerates the plasticization of the material of the workpiece arrangement.

In another preferred embodiment, the engagement end of the pin has a friction pin extending in the direction of its longitudinal axis, which pin can penetrate into the surface of a workpiece. It is particularly preferred here if the engagement end of the pin has a hole extending in the direction of the longitudinal axis, and the friction pin is accommodated in a slidable manner in the hole, making it possible to adjust the length by which the friction pin projects beyond the engagement end of the pin and hence to adjust the depth to which the friction pin penetrates into the surface of the workpiece arrangement.

It is furthermore particularly preferred if the pin has a threaded hole, which extends transversely to the longitudinal axis and opens into the hole and into which a fixing screw is screwed, by means of which the angular position of the friction pin relative to the pin can be fixed. Another preferred option is one in which the pin has a threaded adjustment hole, which extends in the direction of the longitudinal axis, starts from the coupling end, opens into the hole and into which an adjusting screw is screwed. The adjusting screw then serves as an adjustable stop when setting the amount by which the friction pin penetrates into the surface of the workpiece arrangement.

The friction pin, which is provided on the engagement end of the pin in a preferred embodiment, is suitable for penetrating into the material of the workpiece or workpieces, below the surface of the workpiece arrangement, when carrying out a friction stir welding process—e.g. "Self Clamping Friction Stir Spot Welding" (SCFSSW)—while plasticizing the surrounding material of the workpieces by virtue of its rotation. Along its circumferential surface, the friction pin can have a structured surface, which allows a more effective rubbing action, i.e. accelerates the plasticization of the material of the workpieces. Here, the position of the friction pin in the hole can preferably be adjusted with the aid of the abovementioned adjusting screw and fixed by means of the fixing screw. In this case, the friction pin projects beyond the engagement end of the pin and out of the hole to the extent to which it is intended to penetrate into the material of the workpieces. Once this maximum penetration depth has been reached, the engagement end of the pin strikes against the surface of the workpiece arrangement and prevents further penetration.

In a preferred embodiment, the spring element is simply designed as a helical spring, in which case the contact pressure exerted on the workpiece arrangement by the holddown element can be defined by means of the dimensioning of the spring. However, it is also conceivable for the spring element to be designed as a ring of elastic material. Both the helical spring and the ring of elastic material can be arranged around the pin, i.e. the pin passes through the cavity surrounded by the helical spring and the ring. The helical spring has substantially linear elastic properties, i.e. a constant spring stiffness in relation to its deformation, while the spring stiffness of the ring of elastic material can likewise be constant, but can also vary with increasing deformation of the ring.

In another preferred embodiment, the spring element has an annular volume, the dimension of which in the direction of the longitudinal axis is variable and is filled with a fluid, wherein the volume is in fluid communication with a controllable pressure source. The spring element or the stiffness thereof is thus defined by means of a controllable hydraulic, pneumatic or hydropneumatic pump, in which the fluid pressure, i.e. the liquid and/or gas pressure in the spring element, is set with the aid of the pump in response to certain inputs. For example, the stiffness can be reduced, the further the friction pin penetrates into the material or the lower the torque applied to the pin, in order to adapt the pressure applied by the clamping device to the workpiece arrangement to the shear forces between the individual workpieces, for example. In this way, slipping of the workpieces relative to one another can be prevented at all stages of the welding process.

In a preferred embodiment, the pin has an encircling radial projection, and the counter bearing has a bearing housing with an encircling radial recess, the recess engaging with the projection of the pin, so that a free rotary motion of the pin about its longitudinal axis relative to the counter bearing is possible and an axial movement of the pin along its longitudinal axis relative to the counter bearing is prevented. It is particularly preferred here if the spring element is provided between the holddown element and the bearing housing, and the counter bearing has a linear guide, which engages with the holddown element, so that the holddown element is slidable in a guided manner along the longitudinal axis of the pin, relative to the counter bearing.

It is furthermore particularly preferred if bearing elements are provided between the projection of the pin and the bearing housing, reducing the friction between the pin and the bearing housing.

The spring element is thus preloaded when the holddown element is moved relative to the counter bearing in the direction of the longitudinal axis of the pin along the linear guide. The bearing elements between the projection of the pin and the bearing housing are preferably designed as rolling contact or sliding contact bearings. They facilitate and stabilize the movement of the pin about its longitudinal axis, relative to the counter bearing, and define the position of the pin along its longitudinal axis, relative to the counter bearing.

It is preferable if both the pin and the clamping device, i.e. the counter bearing and the holddown element, have a substantially rotationally symmetrical cross section relative to the longitudinal axis of the pin. It is furthermore preferred if the pin, the spring element, the holddown element and the counter bearing are arranged relative to one another in such a way that the spring element surrounds the pin concentrically, and the holddown element and/or the counter bearing surround the spring element concentrically.

In a preferred embodiment, the bearing surface of the holddown element has a recess, which is arranged concentrically around the longitudinal axis of the pin for receiving plasticized material. The plasticized material that may have been displaced by the pin or friction pin during engagement with the surface of the workpiece arrangement can be received into this recess without the holddown element being forced away from the surface of the workpiece arrangement by this material. Moreover, the plasticized material is in this way given a controlled, predefined shape which distinguishes the spot welds.

In another preferred embodiment, a stripper element, preferably a ceramic element, is arranged between the pin and the holddown element, resting on the pin with positive engagement in relation to the plane perpendicular to the longitudinal axis of the pin. The stripper element is provided for the purpose of stripping plasticized workpiece material adhering to the pin from the pin as the pin is removed from the surface of the workpiece arrangement, i.e. to remove it and, where appropriate, guide it into the recess of the holddown device. In addition, the stripper element also serves as a seal against penetration of plasticized material into the interior of the tool during the joining process.

In the relaxed state of the spring element, the pin is preferably arranged relative to the clamping device in such a way that the engagement end is arranged offset in the direction of the coupling end, relative to the plane in which the bearing surface lies. This ensures that the holddown element is already pressing on the surface of the workpiece arrangement with a certain force in order to clamp it when the pin touches the surface of the workpiece arrangement in order to engage with the latter. The size of this offset must be matched to the required clamping force and/or spring stiffness.

DRAWINGS

The present invention is explained below with reference to a drawing which shows only preferred embodiments of the present invention. In the drawing.

DETAILED DESCRIPTION

FIGS. 1 to 4 show a first embodiment of a friction welding tool 1 according to the invention. The friction welding tool 1 has a pin 3 and a clamping device 5, which is held thereon in a manner which allows rotary motion.

The pin 3 is substantially rotationally symmetrical relative to its longitudinal axis 7 and has a coupling end 9 and an engagement end 11 lying opposite the coupling end 9. At its coupling end 9, the pin 3 has a coupling section 13, which is provided for detachable coupling to a rotating output device of a machine tool, e.g. the chuck mounted on an output shaft. Such a machine tool can be a machining center, a drilling machine, a milling machine or a hand tool, for example. For this purpose, an engagement recess 15 is provided in the circumferential surface of the coupling section 13 of the preferred illustrative embodiments shown here, said recess serving to enable rotationally fixed coupling to the output device, that is to say, for example, the chuck.

The engagement end 11 of the pin 3 is provided for the purpose of engaging with the surface of a workpiece arrangement (not shown) consisting of one or more workpieces, possibly arranged directly one above the other or one adjacent to the other.

In the case of the first illustrative embodiment, the pin 3 has a friction surface 17 (see FIG. 1) lying perpendicular to the longitudinal axis 7 on its engagement end 11, said surface being provided for the purpose of rubbing on the surface of the workpiece arrangement and at least partially plasticizing the underlying material at least of the uppermost of the workpieces of the workpiece arrangement. For this purpose, it is preferred if the friction surface 17 has a structure, e.g. radially extending projections, which enables a more effective rubbing action, i.e. which intensifies and accelerates the plasticization of the material of the workpiece arrangement.

Figure 1:
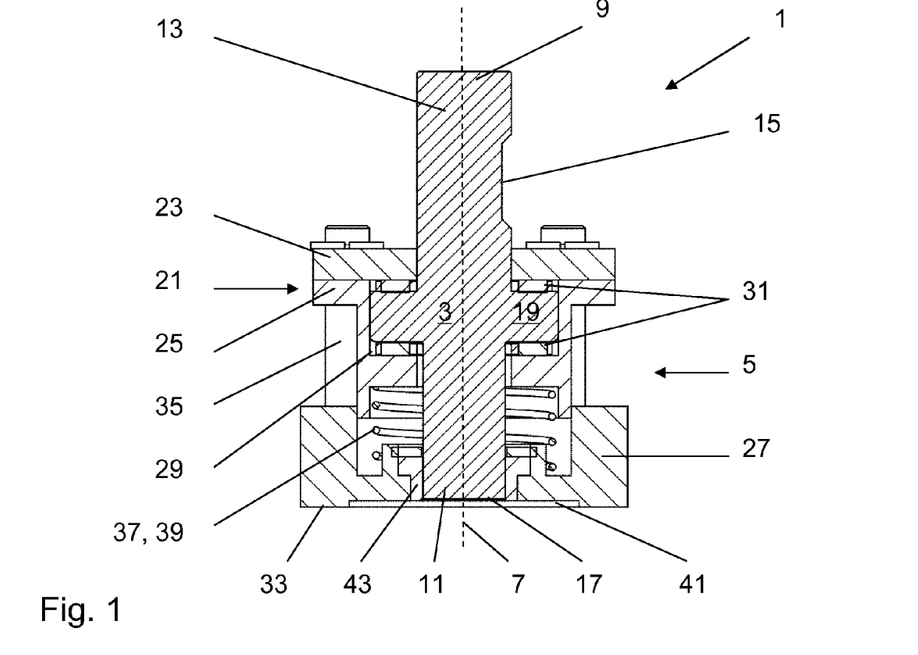
FIG. 1 shows a sectional view along the longitudinal axis of the pin of a first embodiment of a friction welding tool according to the invention.

The pin 3 furthermore has an encircling projection 19 extending in the radial direction relative to the longitudinal axis 7, said projection being provided for the purpose of engaging with a counter bearing 21 of the clamping device 5.

In addition to the counter bearing 21, which has an upper disk 23 and a bearing housing 25, the clamping device 5 comprises a holddown element 27.

The bearing housing 25 of the counter bearing 21 has an encircling recess 29 arranged in the radial direction of the longitudinal axis 7 of the pin 3, said recess being provided for the purpose of engaging with the projection 19 of the pin 3, with the result that the counter bearing 21 consisting of the upper disk 23 and the bearing housing 25 of the clamping device 5 can be rotated freely relative to the pin 3 about the longitudinal axis 7 thereof but is held on said pin in a manner which prevents movement in the direction of its longitudinal axis 7.

For this purpose, bearing elements 31, preferably rolling contact or sliding contact bearings, are provided between the projection 19 of the pin 3 and the bearing housing 25. These bearing elements 31 facilitate and stabilize the movement of the projection 19 relative to the bearing housing 25 and hence the rotation of the pin 3 relative to the clamping device 5. Movement of the pin 3 in the direction of its longitudinal axis 7 relative to the counter bearing 21 is prevented by the engagement of the projection 19 with the bearing housing 25 and the upper disk 23, and the bearing elements 31 prevent play of the projection 19 relative to the bearing housing 25.

The holddown element 27, which is arranged on the side of the counter bearing 21 facing the engagement end 11 of the pin 3, is provided for the purpose of exerting pressure on a workpiece arrangement, and, on the side facing in the direction of the engagement end 11 of the pin 3, has a bearing surface 33, which is provided for the purpose of bearing on the surface of a workpiece arrangement.

Figure 2:
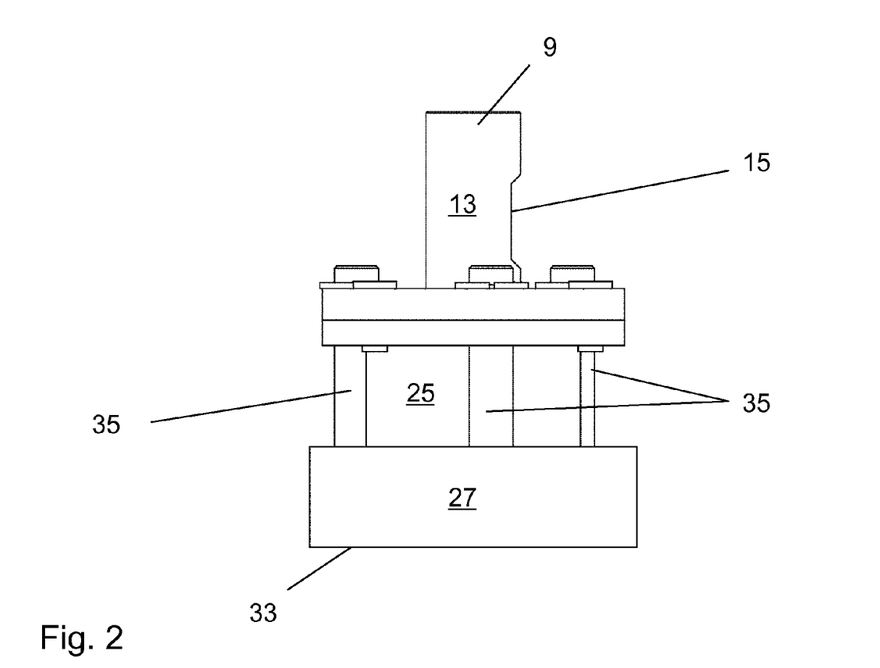
FIG. 2 shows a side view of the embodiment from FIG. 1.
Figure 3:
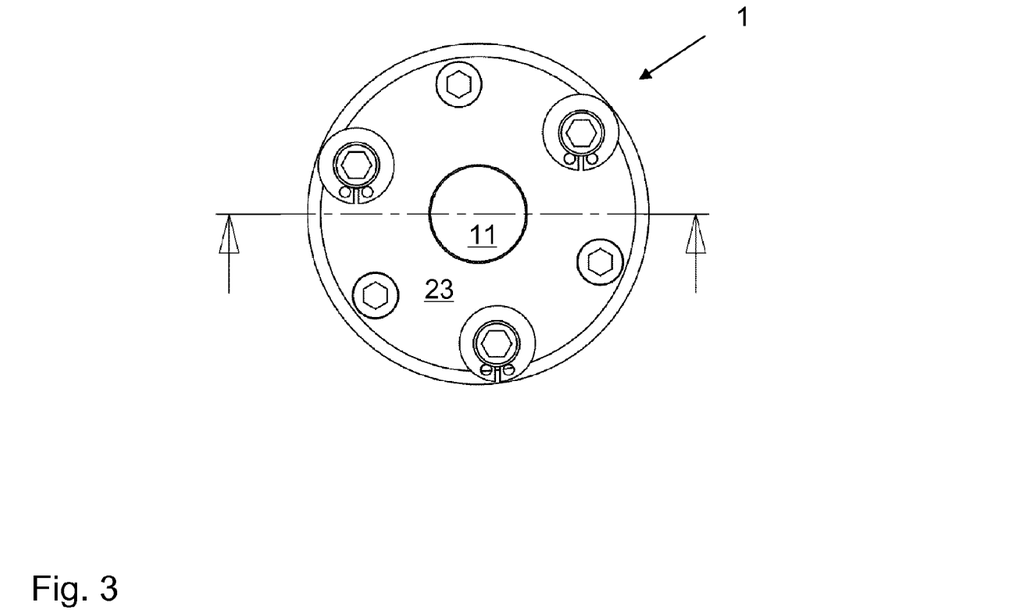
FIG. 3 shows a plan view of the embodiment from FIG. 1 in the direction of the longitudinal axis of the pin.
Figure 4:
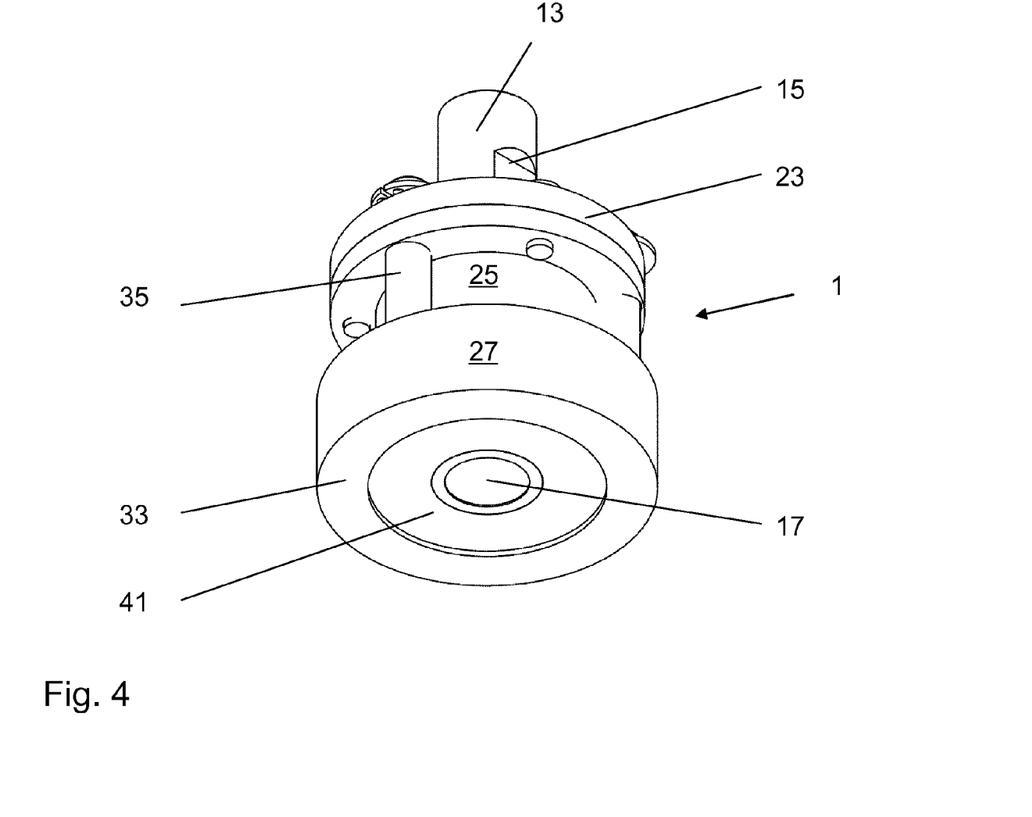
FIG. 4 shows a perspective view of the embodiment from FIG. 1.

The counter bearing 21 has a linear guide aligned axially relative to the longitudinal axis 7 of the pin 3, said guide being in the form of guide pins 35, which are mounted movably on the bearing housing 25 and the upper disk 23 and extend parallel to the longitudinal axis 7 of the pin, these pins, in turn, being mounted securely on the holddown element 27, thus allowing the holddown element 27 to be moved in a guided manner along the longitudinal axis 7 of the pin 3, relative to the counter bearing 21 or bearing housing 25 and the upper disk 23 (see FIG. 2). At the same time, any movement of the holddown element 27 that is not in the direction of the longitudinal axis 7 of the pin 3 is prevented by the guide pins 35 forming the linear guide.

A spring element 37 is arranged between the holddown element 27 and the counter bearing 21 or bearing housing 25, said spring being preloaded when the holddown element 27 is moved toward the counter bearing 21 along the linear guide 45.

As the figures show, the clamping device 5 is likewise of substantially rotationally symmetrical configuration relative to the longitudinal axis 7 of the pin 3 (see FIG. 3), the pin 3 being surrounded by the spring element 37 and the spring element 37 being surrounded by the holddown element 27 and/or the counter bearing 21 (FIG. 1).

Concentrically around the longitudinal axis 7 of the pin 3, the bearing surface 33 of the holddown element 27 has an annular recess 41, which is provided for the purpose of receiving plasticized material thrown up by the engagement of the pin 3 with the surface of the workpiece arrangement and giving it a predefined shape (see FIG. 4), which distinguishes the engagement points on the surface of the workpiece arrangement.

A stripper element 43 is arranged between the pin 3 and the holddown element 27, making positive engagement in relation to the plane perpendicular to the longitudinal axis 7 of the pin 3, said stripper element resting on the pin 3 and the holddown element 27 and preferably being formed from ceramic material. The stripper element 43 is provided for the purpose of stripping plasticized material adhering to the circumferential surface of the pin 3 when the holddown element 27 moves toward the engagement end 11 relative to the pin 3, that is to say the engagement end 11 disengages from the surface of the workpiece arrangement. In addition, the stripper element 43 serves as a seal against penetration of plasticized material into the interior of the tool during the joining process.

In the relaxed state of the spring element 37, the pin 3 is arranged relative to the clamping device 5 in such a way that the engagement end 11 of the pin 3 is arranged offset in the direction of the coupling end 9, relative to the plane in which the bearing surface 33 extends. In the relaxed state of the spring element 37, the engagement end 11 and the friction surface 17 are thus set back relative to the bearing surface 33, as can also be seen in FIG. 1.

As a result, the spring element 37 is already subject to a preload, i.e. the holddown element 27 is already pressing with a certain clamping force on the surface of the workpiece arrangement, when the pin 3 enters into engagement with the surface of the workpiece arrangement. Slipping of the workpieces due to the shear forces between the workpieces caused by the rotary motion of the pin 3 can thus be prevented.

The friction welding tool 1 can be used as follows. First of all, the pin 3 is connected in a rotationally fixed manner, by means of its coupling section 13, to the output device of a machine tool, with the engagement recess 15 engaging positively with an element of the output feature.

The friction welding tool 1 is then placed against the workpiece arrangement in such a way that the bearing surface 33 of the holddown element 27 rests firmly on the surface of the workpiece arrangement, with the engagement end 11 of the pin 3 initially being arranged at a distance above the region of the workpiece arrangement on which the weld is to be produced, owing to the offset between the engagement end 11 and the bearing surface 33.

The workpiece arrangement can have one or more plate-shaped workpieces arranged one above the other or overlapping, for example, which rest on a support, and therefore said workpieces are held together or clamped together by a pressure built up on the surface of the uppermost workpiece by the holddown element 27 and are thus fixed in their positions relative to one another without being able to slip easily.

The pin 3 is then made to rotate by the rotating output device of the machine tool. The pin 3 thus also rotates relative to the clamping device 5, with the projection 19 rotating in the bearing housing 25, since the holddown element 27 is already resting by means of its bearing surface 33 on the surface of the workpiece arrangement and therefore does not follow this movement.

The output device and hence the pin 3 is then moved in the direction of the surface of the workpiece arrangement until the engagement end 11 of the pin 3 engages with the surface of the workpiece arrangement. During this movement, the counter bearing 21 is guided relative to the holddown element 27 and toward the latter by the guide pins 35 forming the linear guide and does not rotate with the pin 3. During this relative movement of the counter bearing and the holddown element, the helical spring 39 forming the spring element 37 is preloaded, and this preloading force is transmitted to the surface of the workpiece arrangement.

The offset of the engagement end 11 of the pin 3, relative to the plane in which the bearing surface 33 lies, and the stiffness of the helical spring 39 should be matched in such a way that there is a sufficient clamping force from the holddown element 27 acting on the workpiece arrangement, even when the pin 3 enters into engagement by means of its engagement end 11 with the surface of the workpiece arrangement, thus ensuring that the workpieces cannot slip relative to one another and that no gaps can form.

The plasticized material thrown up during the engagement of the pin 3 with the surface of the workpiece arrangement can be received by the recess 41 in the bearing surface 33 of the holddown element 27 and given a predefined shape which distinguishes the welding points in a uniform manner. Once the material of the workpieces has been sufficiently plasticized to produce the required joint, the pin 3 is moved away from the workpiece arrangement in the direction of its coupling end 9, with plasticized material adhering to the pin 3 being stripped from the pin 3 by the stripper element 43 and guided into the recess 41. During this process, the stripper element 43 also acts as a seal.

As is evident from the above description of the first illustrative embodiment of the present invention, the friction welding tool 1 according to the invention can be mounted in a simple manner on an output shaft of a conventional machine tool or of a conventional robot, for example, by means of the coupling end 11 without the need to provide additional clamping devices.

Figure 5:
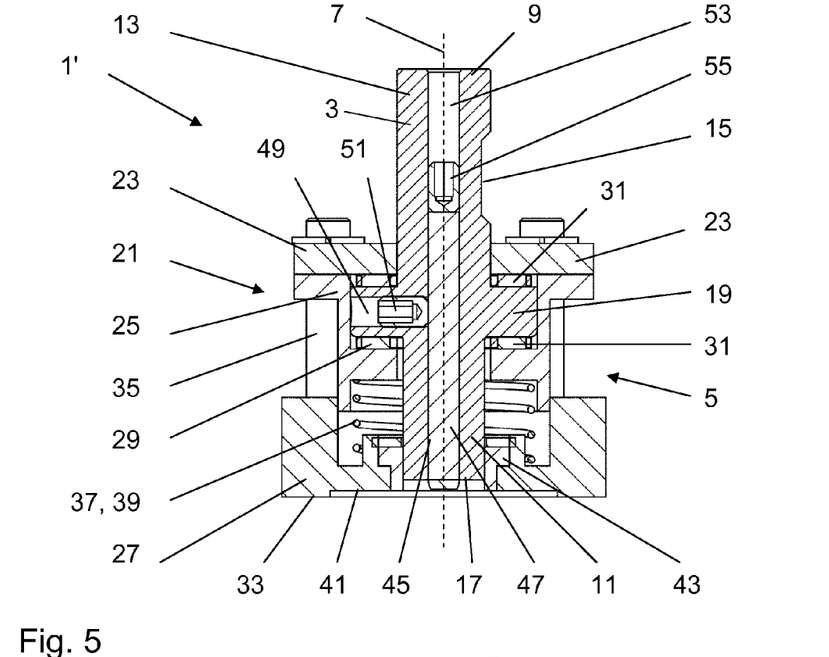
FIG. 5 shows a sectional view along the longitudinal axis of the pin of a second embodiment of the present invention.

FIG. 5 shows a second embodiment of a friction welding tool 1' according to the invention, in which identical parts to those in the first embodiment are provided with the same reference signs.

The second embodiment of a friction welding tool 1', like the first embodiment, has a pin 3 which is substantially rotationally symmetrical relative to its longitudinal axis 7 and has a projection 19 extending in the radial direction relative to the longitudinal axis 7. The projection 19 likewise engages by means of a recess 29 in a bearing housing 25 of the counter bearing 21, with the result that the pin is held in the counter bearing 21 in such a way that it can be rotated but cannot be moved in the axial direction of the longitudinal axis 7, and, once again, bearing elements 31 are provided, ensuring a play-free rotary motion.

In this illustrative embodiment too, a holddown element 27 is held on the counter bearing 21 by means of a linear guide formed by guide pins 35 in such a way that it can be moved in the direction of the longitudinal axis 7, the holddown element 27 having a bearing surface 33 with a recess 41 provided therein. A spring element 37 in the form of a helical spring 39 is furthermore provided between the holddown element 27 and the counter bearing 21.

On the one hand, the pin has a coupling end 9 having a coupling section 13 and an engagement recess 15 provided therein, thus enabling the coupling section 13 to be mounted on an output feature that is driven in rotation. The engagement end 11 remote from the coupling end 9 is provided with a friction surface 17, but, in this preferred illustrative embodiment, it has a hole 45 that extends in the axial direction parallel to the longitudinal axis 7 of the pin 3. A friction pin 47 extending beyond the friction surface 17 is accommodated in the hole 45 and, when the engagement end 11 enters into engagement with the surface of a workpiece arrangement, it penetrates into said surface.

A threaded hole 49 extending radially relative to the longitudinal axis 7 of the pin 3 is furthermore provided in the pin 3 of the second embodiment of a friction welding tool 1', in the region of the projection 19, the threaded hole accommodating a fixing screw 51 which serves to fix the friction pin 47 in a torsionally rigid manner relative to the pin 3.

A threaded adjustment hole 53 is furthermore formed in the pin 3, the hole extending from the coupling end 9, and an adjusting screw 55 is accommodated in said hole. The adjusting screw 55 forms the rear stop for the friction pin 47, and therefore the position of the adjusting screw 55 can be used to set the amount by which the friction pin 47 projects beyond the friction surface 17. The friction pin 47 can have a structured surface along its circumference in order to achieve a more effective rubbing action and thus plasticize the material more quickly and more intensively.

As in the first embodiment, the second embodiment has a stripper element 43 which surrounds the pin 3 in a positive manner.

The second embodiment of a friction welding tool 1' can be used in a similar way to the first embodiment, with the sole difference that the friction pin 47 penetrates into the material of the workpieces of the workpiece arrangement, and it is therefore possible to produce butt joints or overlapping joints, inter alia, by means of a friction stir welding process, with the material of the workpiece/workpieces being plasticized to a greater depth.

In all cases, however, there is the advantage in this embodiment too that the friction welding tool 1' can be coupled to the output feature of a machine tool in a simple manner, and it is not necessary to provide an additional clamping device on the machine tool.

Figure 6:
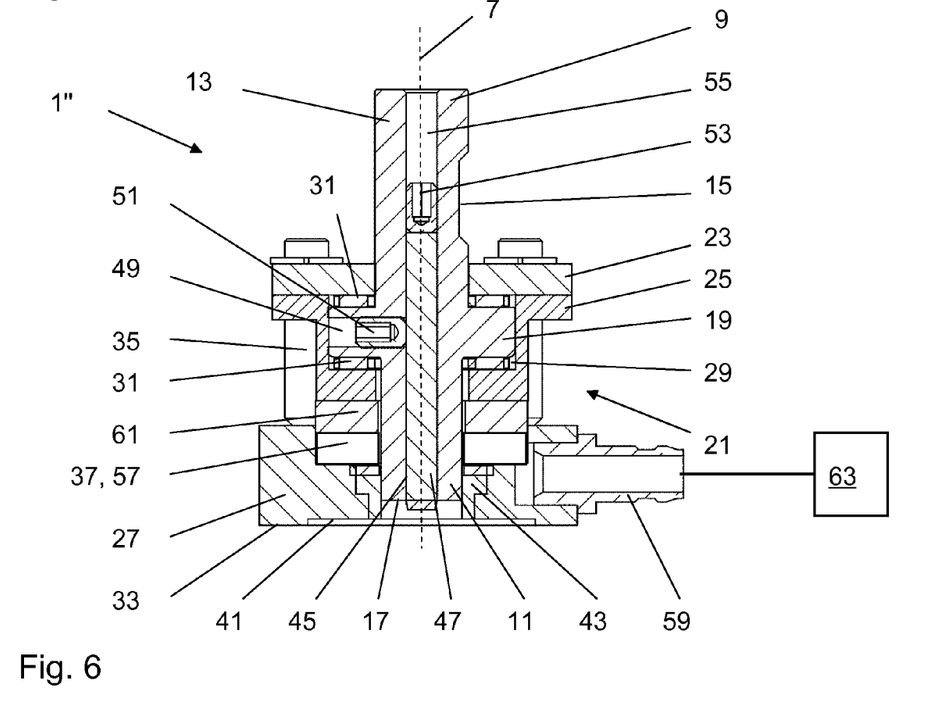
FIG. 6 shows a sectional view along the longitudinal axis of the pin of a third embodiment of the present invention.

Finally, FIG. 6 shows a third embodiment of a friction welding tool 1" according to the invention, which differs from the second illustrative embodiment in the design of the spring element 37 but is otherwise of similar construction, and therefore identical components are designated by the same reference signs.

While in the first two embodiments the spring element 37 was designed as a helical spring 39, the spring element 37 in the third embodiment of the friction welding tool 1" according to the invention is constructed in such a way that the holddown element 27 has a closed annular volume 57, the dimension of which in the direction of the longitudinal axis 7 is variable and into which a fluid can be introduced via a pressure connection flange 59. The variability in the direction of the longitudinal axis 7 of the annular volume 57 is obtained by forming the volume 57 by means of a recess in the holddown element 27, into which a ring element 61 on the bearing housing 25 partially extends, the annular volume 57 thus being completely surrounded and hence closed by the holddown element 27, the ring element 61, the pin 3 and the stripper element 43.

In this arrangement, the annular volume 57 is in fluid communication with a controllable pressure source 63, it being possible to subject the fluid to a pressure in a controllable manner. It is thereby possible to control the spring force acting between the holddown element 27 and the counter bearing 21 by means of the pressure of the fluid in the annular volume. Thus, for example, it is possible to adjust the contact pressure applied by means of the spring element 37 in the required manner during the welding process. This can be implemented in such a way that the contact pressure is particularly high at the beginning, when the material of the workpiece/workpieces is not yet plasticized, and then decreases with increasing plasticization and softening of the material.

Whereas a helical spring 39 or an annular volume 57 filled with a pressurized fluid was used for the spring element 37 in the embodiments described above, it is equally conceivable instead to use a ring consisting of an elastic material or an arrangement of several spring elements, for example, and the invention is not restricted to said abovementioned possibilities.

What is claimed is:

1. A friction welding tool comprising:
a pin having a longitudinal axis, an encircling radial projection, a coupling end and an engagement end lying opposite the coupling end, said longitudinal axis extending between the coupling end and the engagement end, said pin being rotatable about said longitudinal axis, said encircling radial projection being disposed between said coupling end and said engagement end, said coupling end being adapted to be releasably coupled to an output device of a machine tool for rotation therewith, wherein rotation of said in about said longitudinal axis is adapted to engage said engagement end with a surface of a workpiece arrangement,
a clamping device surrounding said pin and being movable along said longitudinal axis, said clamping device being configured for exerting pressure on the surface of the workpiece arrangement,
said clamping device having a counter bearing, which is held on said pin between said coupling end and said engagement end in a manner which allows said clamping device to be rotated freely around the longitudinal axis of said pin and prevents said clamping device from being moved along said longitudinal axis,
said clamping device having a holddown element surrounding said pin, said holddown element being arranged on a side of the counter bearing facing said engagement end and having a contact surface that is configured to contact the workpiece arrangement, and
a spring element provided between the holddown element and the counter bearing such that said holddown element is slidable along said longitudinal axis of said pin and biased away from said counter bearing, wherein said counter bearing has a bearing housing with an encircling radial recess, said encircling radial recess receiving said encircling radial projection, said counter bearing being configured to permit free rotary motion of said pin about said longitudinal axis relative to said bearing housing and to engage opposite sides of the encircling radial projection to inhibit axial movement of said in along said longitudinal axis relative to said bearing housing.

2. The friction welding tool of claim 1, wherein said engagement end has a friction surface that extends perpendicularly to said longitudinal axis.

3. The friction welding tool of claim 1, wherein said engagement end has a friction pin that extends along said longitudinal axis.

4. The friction welding tool of claim 3, wherein said engagement end has a hole that extends along said longitudinal axis, and wherein said friction pin is slidably received in said hole.

5. The friction welding tool of claim 4, wherein said pin has a threaded hole into which a fixing screw is threadably engaged, said threaded hole extending transversely to said longitudinal axis and opening into said hole.

6. The friction welding tool of claim 5, wherein said pin has a threaded adjustment hole into which an adjusting screw is threadably received, said threaded adjustment hole extending along said longitudinal axis, said threaded adjustment hole beginning at said coupling end.

7. The friction welding tool of claim 1, wherein said spring element is a helical spring.

8. The friction welding tool of claim 1, wherein said spring element defines an annular volume having a height dimension along said longitudinal axis that varies with an amount by which said spring element is compressed, and wherein said annular volume is in fluid communication with a controllable pressure source.

9. The friction welding tool of claim 1, wherein said spring element is provided between said holddown element and said bearing housing, and wherein said counter bearing has a linear guide that engages with said holddown element, said linear guide guiding said holddown element for sliding movement along said longitudinal axis relative to said counter bearing.

10. The friction welding tool of claim 1, wherein a plurality of bearing elements are provided between said encircling radial projection and said bearing housing.

11. A friction welding tool of claim 1, wherein said contact surface of said holddown element has a recess that is arranged concentrically around said longitudinal axis, said recess being adapted for receiving plasticized material.

12. The friction welding tool of claim 1, wherein a stripper element is arranged between said pin and said holddown element, said stripper element resting on said pin with positive engagement in relation to the plane perpendicular to said longitudinal axis.

13. The friction welding tool of claim 1, wherein said engagement end has a friction surface, and wherein said spring element is configured to urge said holddown element away from said counter bearing such that said friction surface is offset along said longitudinal axis from said contact surface, said friction surface being disposed along said longitudinal axis between said contact surface and said counter bearing.

* * * * *